(12) United States Patent
Coles

(10) Patent No.: US 6,351,050 B1
(45) Date of Patent: Feb. 26, 2002

(54) ELECTRICAL POWER ASSISTED STEERING SYSTEMS

(75) Inventor: Jeffrey Ronald Coles, Solihull (GB)

(73) Assignee: TRWLucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/502,743

(22) Filed: Feb. 11, 2000

(30) Foreign Application Priority Data

Feb. 13, 1999 (GB) ................................................ 9903308

(51) Int. Cl.7 ................................................ H02K 21/12
(52) U.S. Cl. ................................ 310/156.53; 180/443
(58) Field of Search ........................... 310/156, 53, 162, 310/261; 29/598; 318/15; 180/443, 446

(56) References Cited

U.S. PATENT DOCUMENTS

| 4,417,167 | A | * | 11/1983 | Ishii et al. | 310/67 R |
|---|---|---|---|---|---|
| 4,934,472 | A | * | 6/1990 | Bloor et al. | 180/446 |
| 5,191,256 | A | * | 3/1993 | Reiter, Jr. et al. | 310/156 |
| 5,238,079 | A | * | 8/1993 | Gorim | 180/446 |
| 5,437,349 | A | * | 8/1995 | Kurahashi et al. | 180/446 |
| 5,488,260 | A | * | 1/1996 | Heyraud | 310/156 |
| 5,523,637 | A | * | 6/1996 | Miller | 310/156 |
| 5,945,760 | A | * | 8/1999 | Honda et al. | 310/156 |
| 5,962,944 | A | * | 10/1999 | Narita et al. | 310/156 |
| 5,982,067 | A | * | 11/1999 | Sebastian et al. | 310/184 |
| 6,031,311 | A | * | 2/2000 | Lee | 310/156 |
| 6,049,153 | A | * | 4/2000 | Nishiyama et al. | 310/156 |
| 6,072,256 | A | * | 6/2000 | Shon et al. | 310/156 |
| 6,194,849 | B1 | * | 2/2001 | Wilson-Jones et al. | 318/15 |

FOREIGN PATENT DOCUMENTS

WO    9810971    * 3/1998

* cited by examiner

Primary Examiner—Joseph Waks
(74) Attorney, Agent, or Firm—Tarolli, Sundheim, Covell, Tummino & Szabo L.L.P.

(57) ABSTRACT

An electric motor of the brushless type is disclosed which is so constructed and arranged as to provide a low braking torque. An electric power steering system incorporating such a motor is also disclosed. In a preferred arrangement, the motor comprises an interior permanent magnet motor. An advantage of providing a motor which generates low levels of braking torque in the event of a fault is that a driver can easily turn the wheel of the vehicle in the fault condition against the motor. This reduces the requirements for motor fault protection.

13 Claims, 5 Drawing Sheets

ELECTRICAL POWER ASSISTED STEERING SYSTEMS

This invention relates to improvements in electric motors of the brushless type of the kind for use particularly although not exclusively in power assisted steering systems for vehicles in which the motor is adapted to apply an assistance torque to a portion of steering shaft in response to a motor drive signal. The invention also relates to electric power assisted steering systems of the kind set forth.

In one known power assisted steering system, a first portion of the shaft is operatively connected to a steering wheel, a second portion of the shaft is operatively connected to at least one steerable wheel, a torque sensor is adapted to produce an output signal indicative of torque applied to the first portion of the shaft by a driver of the vehicle, and control means are adapted to process the output signal in order to produce the motor drive signal.

The first and second portions of shaft may comprise respective portions of a single shaft, or may each comprise a separate shaft.

The purpose of an electric power assisted steering system of the kind set forth is for the motor to apply an assistance torque to the second portion of shaft which makes it easier for the driver to turn the steering wheel. Typically, the motor is controlled using a pulse width modulation strategy with the motor drive signal being proportional to the torque required from the motor.

In the prior art, such as our earlier application GB 9619175 the motor comprises a direct current brushless motor driven by an electrical circuit in which the motor phase windings are connected in a bridge. Each phase is connected into a separate arm of the bridge between a positive and negative (or ground) supply line. A respective top switching device is connected in series in each arm between a phase winding and the positive supply, and a respective bottom switching device is connected in each arm between a phase winding and the negative (or ground) supply line. Thus, for a 3-phase motor the bridge has 3 arms, each comprising a top and a bottom switching device. The motor can be controlled by pulse width modulating the top and bottom switching devices in the arms in any known manner to cause the motor to rotate.

A problem with brushless permanent magnet motors is that a failure mode exists in which the motor phase windings may be shorted together to form a loop around at least two phases. This typically occurs if two top and/or two bottom devices stick or otherwise fail in a closed state to form a closed path around the electrical circuit.

In such a failure mode, the motor will act as a generator, and any attempt to rotate the rotor within its phase windings will induce a braking force which opposes the movement. In a steering system, this is highly undesirable as in a worst case the braking force may be sufficiently high as to prevent manual rotation of the second portion of shaft by the driver.

The electric motor disclosed in GB 9619175 is shown in FIG. 6 of the accompanying drawings. It includes a rotor 100 carrying a plurality of surface mounted permanent magnets of arcuate section. The magnets 101 are held in position by a non-magnetic sleeve (not shown) of approximately 0.3 mm to 0.5 mm which fits within the air gap 102 between the rotor magnets and the stator 200. Flux passes through this air gap and non-magnetic sleeve to complete a magnetic circuit between poles on the stator and the rotor magnets.

Because of the presence of the non-magnetic sleeve, the gap between stator and rotor is relatively large which results in a low motor reactance with in turn means high levels of braking torque.

It has been proposed to overcome this problem in several ways. Firstly, it is known to provide a clutch between the motor and the shaft. This is disengaged in the event of a motor failure so that the motor will not resist attempts to turn the output shaft manually.

In an alternative, it is known to connect the motor phase windings in a star formation and provide one or more isolating switches at the star point. In the event of a failure, the isolating switches are opened so that it is impossible for a closed loop to form. However, it is still possible for a failure of the isolating switches to occur which would allow a closed loop to form.

An object of the invention is to ameliorate the problems of braking force in a motor in an electric power assisted steering system.

In accordance with a first aspect, the invention provides an electric motor of the brushless type so constructed and arranged as to produce a low braking torque in the event of a failure.

By low braking torque we mean that the braking torque is less than that produced using a standard surface mounted magnet motor. For example, the peak braking torque seen in the steering column due to peak motor braking torque may be less than 70 Nm, or perhaps less than 30 Nm or less than 20 Nm. This low torque ensures that, although the braking torque will be felt through the steering wheel it can be easily overcome by the driver. The low braking torque may be achieved by providing a motor with a high reactance. For example, the impedance of the motor may be greater than 100 mHenry, or preferably greater than at least 130 mHenrys.

The motor may be adapted to provide a peak torque during motoring to the steering shaft of at least 50 Nm, or preferably at least 100 Nm or more.

The motor may, in one especially advantageous arrangement comprise an interior permanent magnet motor having a plurality of permanent magnets buried within a rotor structure.

By "buried" we mean that the magnets are either flush with or below the level of the circumference of the rotor structure. When below the level of the circumference, the magnets may be covered by a magnetic or magnetically susceptible cover to provide a continuous smooth surface to the rotor.

Preferably, the magnets are buried wholly within the rotor structure so that the rotor provides a substantially continuous outer circumferential surface. The magnets may therefore be totally enclosed within the rotor structure.

By providing a buried magnet motor the non-magnetic retaining sleeve required for surface mounted magnets motors can be eliminated, reducing the size of the air gap between the stator and rotor. This results in a motor having a higher impedance and hence lowered braking torque when a failure occurs.

An advantage of an interior permanent magnet motor over a conventional surface mount motor is that there is no longer a need to provide a retaining sleeve to hold the magnets in place. This enables the magnets to be positioned closer to the stator, maximising the value of the motor reactance which decreases the braking torque peak value.

Preferably, each magnet is received within a slot in the rotor below the rotor surface. The magnets may comprise rectilinear flat bar magnets having planar upper and lower faces which are received within slots in a rotor. The rotor may have a unitary construction. Flat magnets are cheaper than arcuate magnets, and are easier to produce.

This arrangement eliminates the need for the retaining sleeve, effectively placing the edges of the magnets closer to the stator and hence reducing the space therebetween.

Preferably, the rotor is of steel or other suitable metallic material. This provides an improved magnetic flux linkage between the stator poles and the rotor magnets.

Of course, other typos of motor could be employed which provide a low braking torque and thus fall within the scope of the present invention.

The rotor may be hollow whereby an axle can be passed through the rotor to attach the rotor to an output shaft. Alternatively, the output shaft could form an integral part of the rotor. Preferably the gap between the stator poles and the outer surface of the rotor is less than 0.5 mm, or ideally less than 0.3 mm. To minimise the braking torque, this should be kept as small as possible within design tolerances. To this end, the slots are preferably provided as close to the circumference of the rotor as is mechanically feasible to place the magnets as close as possible to the stator poles.

The motor may comprise at least two or more phases, although three phases is preferred.

The motor phases may each comprise a number of phase windings connected in series or in parallel. Each phase may be connected either in a Delta or a Wye formation.

In accordance with a second aspect, the invention provides an electric power assisted steering system of the kind set forth in which the motor comprises an interior permanent magnet motor having a plurality of permanent magnets buried within a rotor structure and a number of phase windings provided on a stator arranged concentrically around the rotor structure.

In accordance with a third aspect, the invention comprises a mechanical system comprising an output shaft driven by a motor, in which the motor comprises an interior permanent magnet motor comprising a rotor having a plurality of magnets buried at least partially below the surface of the rotor.

The system may comprise in one arrangement, an electric power assisted steering system whereby the output shaft is operatively connected to a steering shaft. Alternatively, if may comprise any other direct drive mechanical system in which it is desirable to minimise braking torque during motor failure.

There will now be described, by way of example only, one embodiment of the present invention with reference to the accompanying drawings in which.

Figure 1:
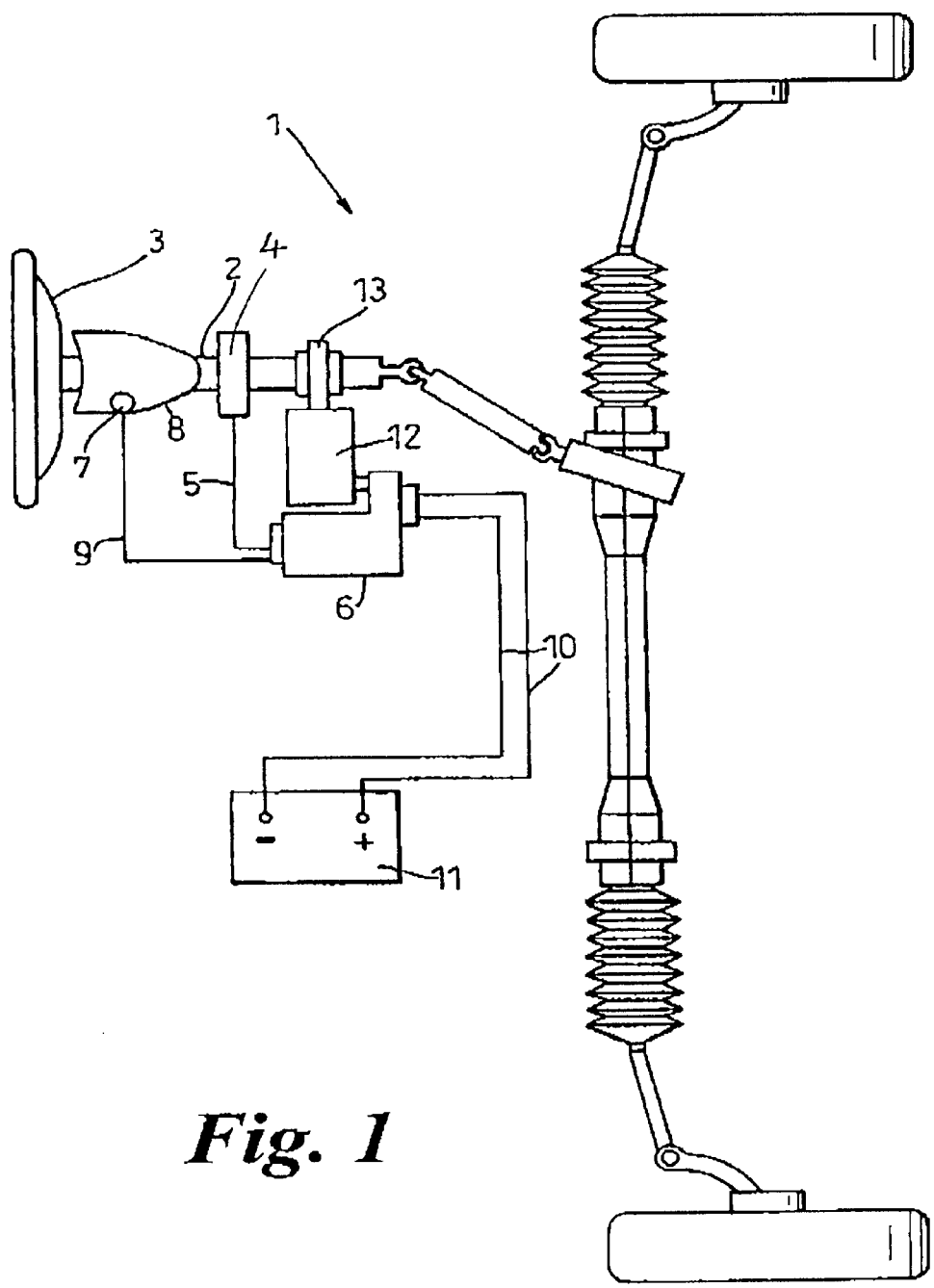
FIG. 1 is a schematic illustration of an electric power assisted steering system in accordance with the invention.

The electrical power assisted steering system 1 shown in FIG. 1 of the accompanying drawings comprises an input shaft in the form of a length of steering column shaft Z connected to a steering wheel 3 for the vehicle.

A torque sensor 4 is adapted to measure the torque applied to a first portion of the steering column shaft by a driver as the steering wheel is turned. The sensor produces an output signal which is fed by electrical wires 5 to a control unit 6. An output signal from a vehicle ignition switch 7 provided on a steering column shroud 8 is also fed along wires 9 to the control until to provide an indicator as to when the power assistance assembly should operate (although the ignition does not form a part of the power steering assembly).

The control unit 6 comprises an electrical circuit which is connected by wires 10 to a battery 11 or other source of electrical power.

The control unit processes the output signal from the torque sensor to produce a motor drive signal proportional to the torque required from a low braking torque electric motor 12 which is connected to a second portion of the steering column shaft 2 through a gearbox 13.

In use, the motor is driven in response to the motor drive signal to apply an assistance torque to the shaft 2.

Figure 2:
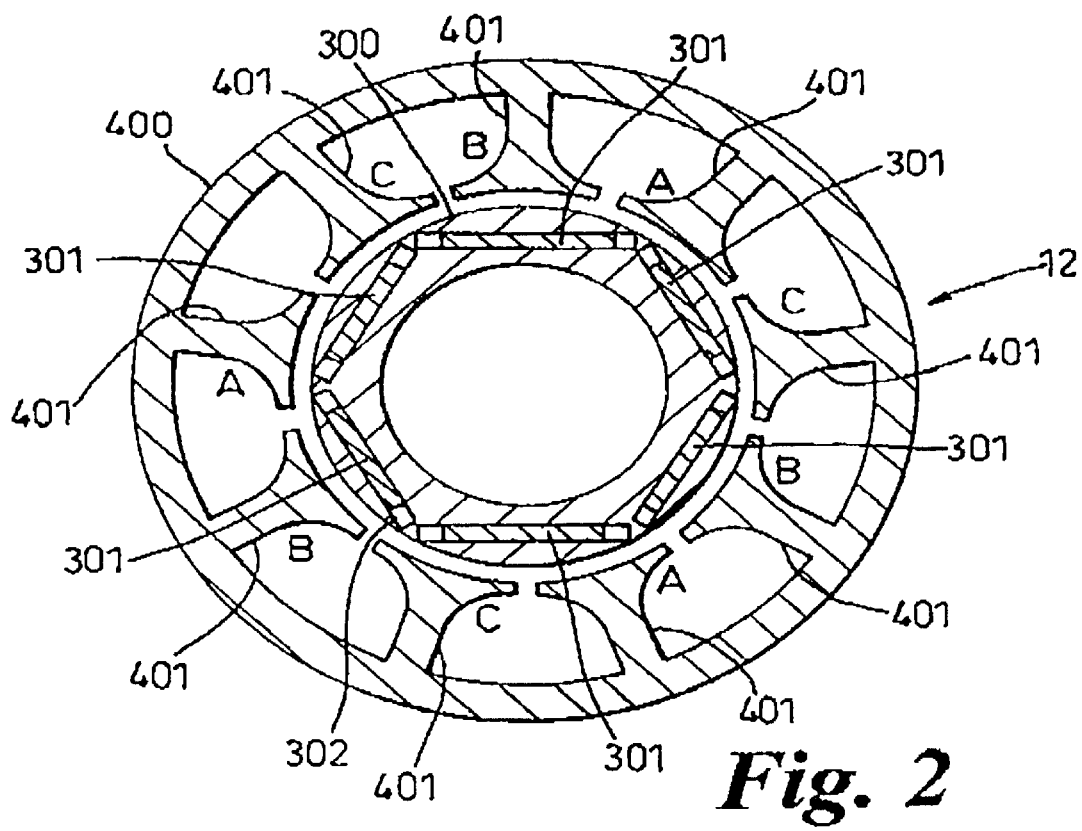
FIG. 2 is a cross-section through a motor as shown in FIG. 1.

The motor is shown in schematic form in FIG. 2. This illustrates a cross section through the motor.

As can be seen, by way of example, the motor 12 comprises an internal permanent magnet motor. The rotor 300 comprises a rotor body within which six planar rectilinear permanent magnets 301 are buried. The magnets are equally spaced circumferentially around the rotor 300 and have alternate north and south polarities. The magnets 301 are each located within a slot 302 so that the rotor structure encloses the magnets to present a substantially smooth circumferential surface around the outside of the rotor.

The rotor is axially aligned within a cylindrical stator 400 which, as shown, has nine poles 401. Each pole 401 carries a phase winding comprising a number of coils of wire. The interior of the stator 400 is complementary to the exterior surface of the rotor structure so that only a small air gap is present.

Figure 3:
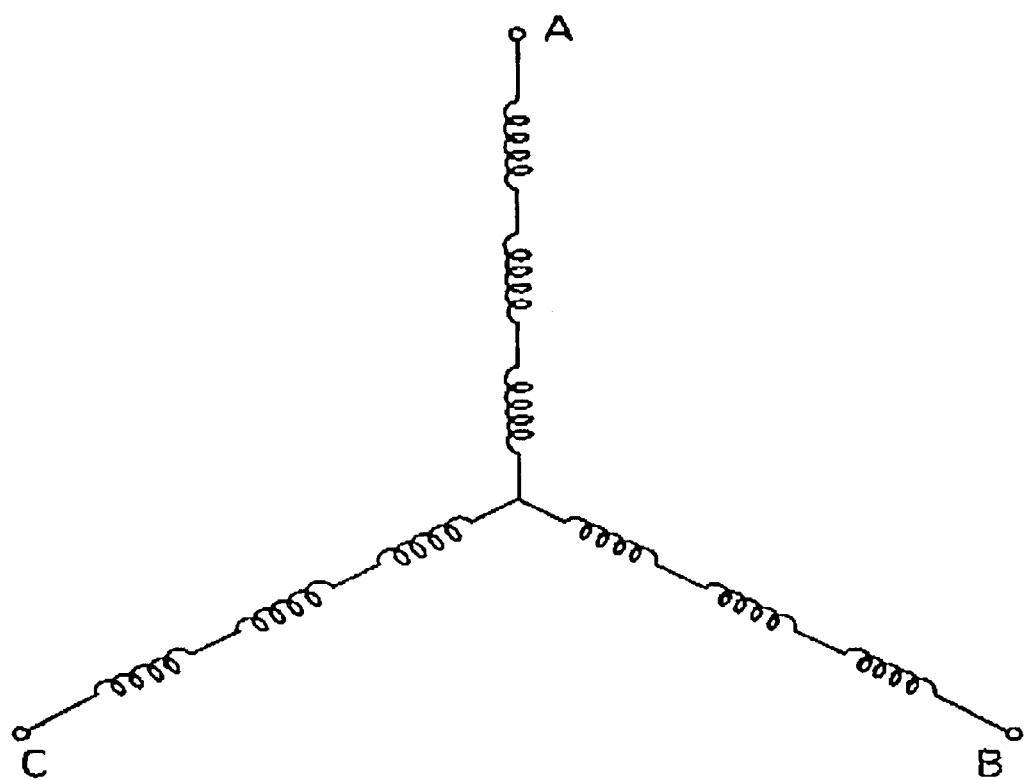
FIG. 3 shows the arrangement of the phase windings in the motor of FIG. 2.

The motor comprises a three phase device, each phase for convenience being labelled A, B and C respectively. As shown in FIG. 3, three windings (one per pole) are connected in series to form a single phase, and the phases can be connected into a three arm bridge to drive the motor.

Providing a motor with a low braking torque is achieved by maximising the impedance, which in turn is produced by maximising the level of a machine reactance. This is achieved in a buried magnet motor.

Figure 6:
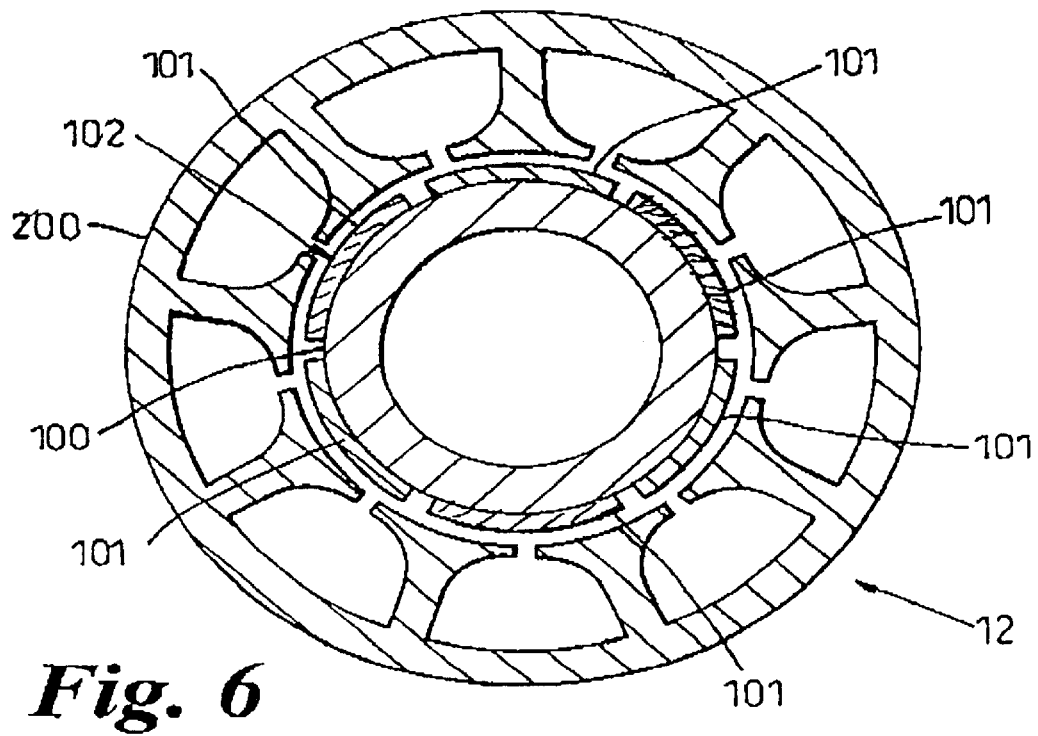
FIG. 6 is a cross-sectional view of a prior art conventional surface mounted magnet motor.
Figure 4:
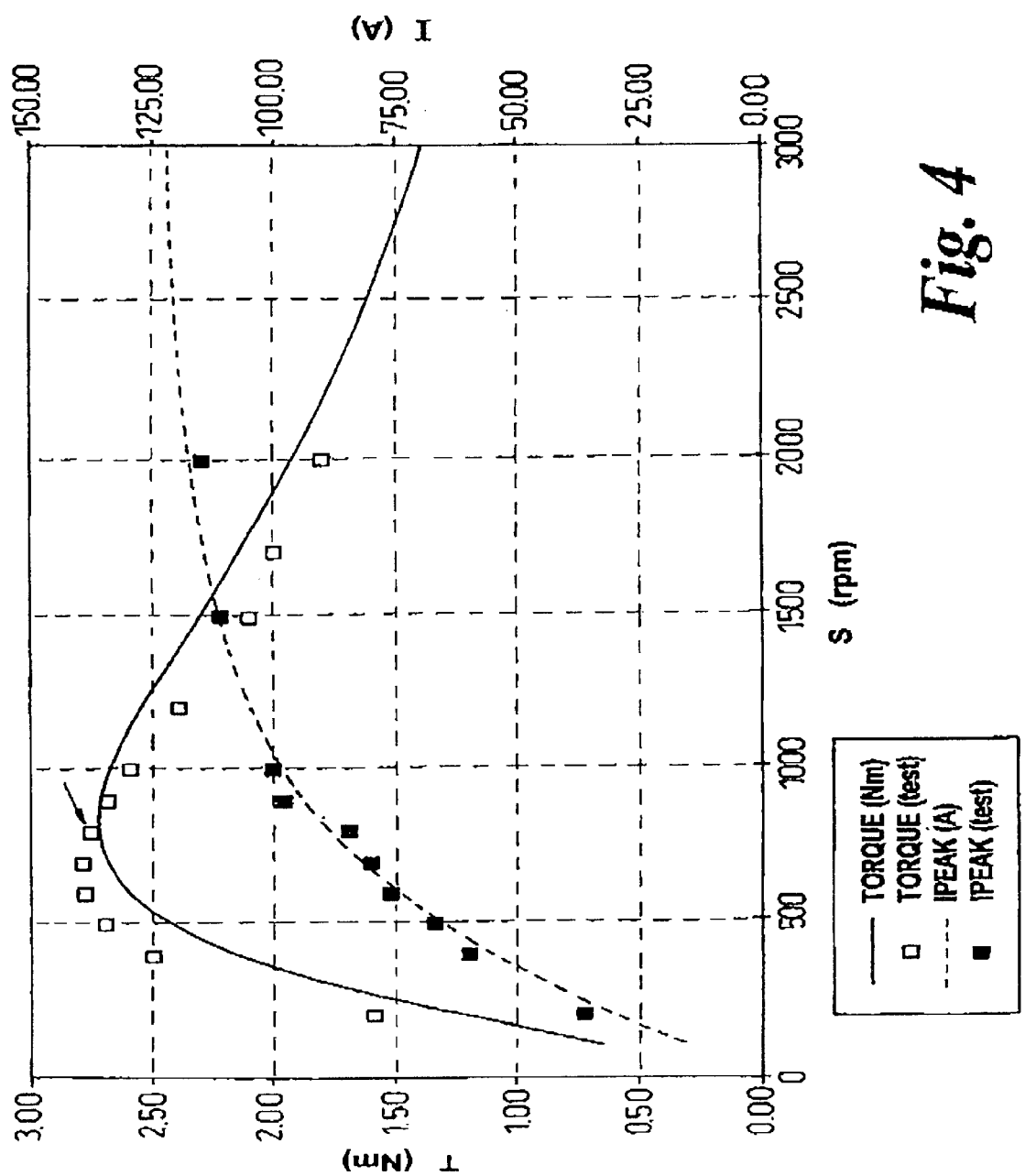
FIG. 4 is a plot of braking torque T against speed S for a conventional surface mounted magnet motor and a plot of current I against the same speed axis.

FIG. 4 is a plot of motor braking torque against motor speed for a three phase conventional surface mounted magnet design as shown in FIG. 6 with all three phases shorted together. The conventional surface mounted magnet motor as illustrated in FIG. 6 is constructed in such a manner where the motor 12, comprises a rotor 100 having permanent magnets 101 mounted to the surface of the rotor 100 by suitable means such as a sleeve 102. The magnets are equally spaced around the rotor surface and have alternate north and south polarities. The rotor 100 is axially aligned with a cylindrical stator 200 which has pole pieces projecting towards the magnets 102, said pole pieces carrying phase windings comprising a number of coils of wire. A peak motor torque of 2.75 Nm was measured, which due to the gear ratio of 16.5:1 between the motor and the steering column translates to a peak braking torque of 53 Nm.

Figure 5:
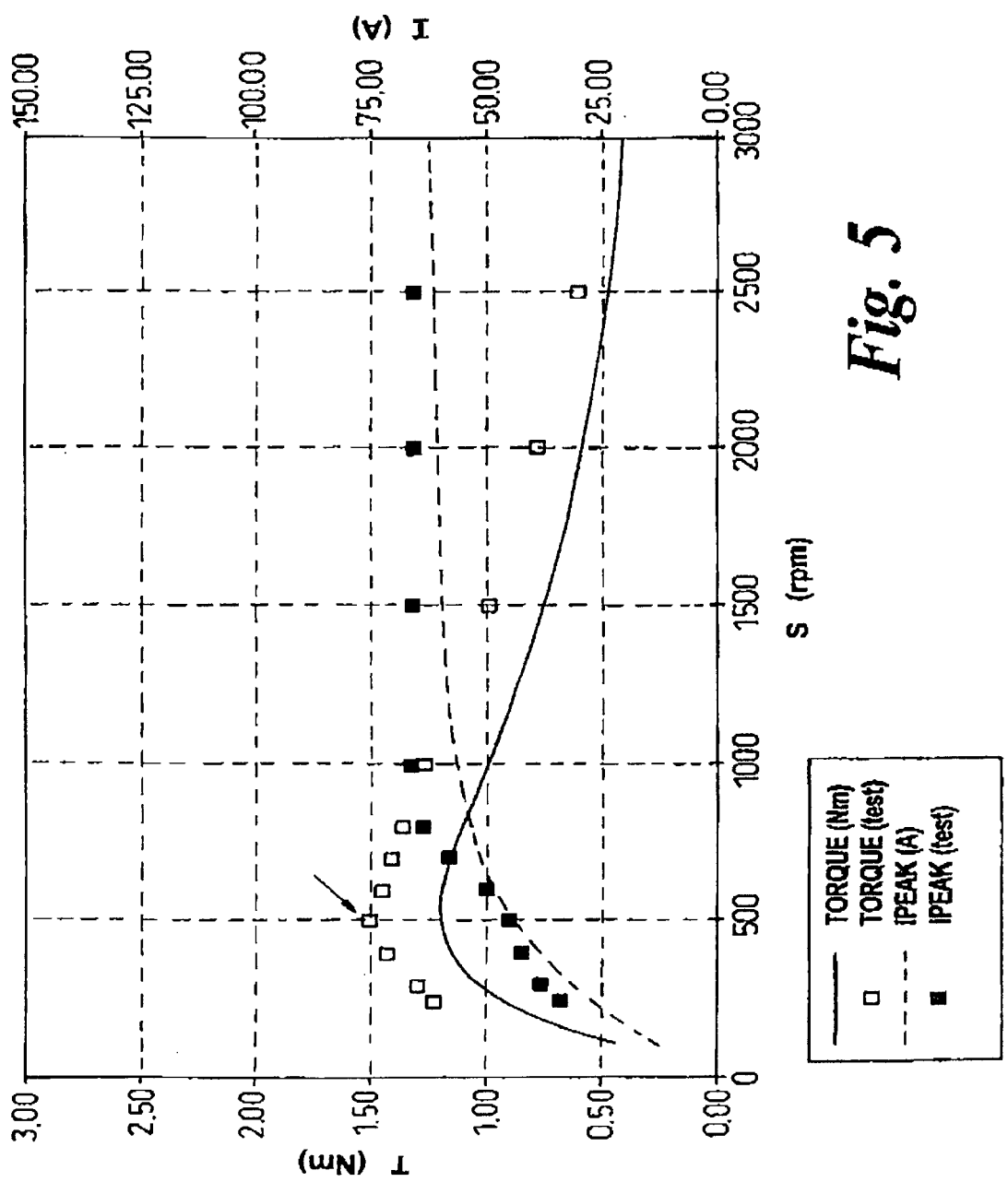
FIG. 5 is a corresponding pair of plots for a similar buried magnet motor.

FIG. 5 shows an equivalent plot for the buried permanent magnet motor of otherwise similar performance to the motor of FIG. 6. The motor has an equivalent inductance of 135 mH at a frequency of 50 Hz and a 5 volt drive voltage, compared to approximately 70 mH for the motor of FIG. 6 of equivalent performance. In this case, a peak motor torque of 1.5 Nm was measured, equal to a peak braking torque at the steering wheel of 29 Nm. This provides a considerable improvement over the standard design at high speeds.

It will be understood that the invention lies in the provision of an electric power assisted steering system in which a motor with low braking torque, such as an internal permanent magnet motor, is provided to alleviate the problems of unwanted braking forces during certain motor failure modes. In some cases, this could completely eliminate the need to provide fault protection to prevent the driver experiencing the effects of dangerous braking torque under motor failure.

What is claimed is:

1. An electric power assisted steering system comprising a steering shaft, means defining a motor drive signal, and a motor adapted to apply an assistance torque to said shaft in response to said motor drive signal, wherein said motor comprises an interior permanent magnet motor having a rotor structure, a stator, and a plurality of permanent magnets buried within said rotor structure flush with or below the surface of the rotor structure and a plurality of phase windings provided on said stator arranged concentrically with the rotor structure.

2. An electric power assisted steering system according to claim 1 in which said motor has a peak braking torque of said motor is less than 2 Nm.

3. An electric power assisted steering system according to claim 1 in which said electric motor has an impedance greater than 100 mHenry.

4. An electric power assisted steering system according to claim 1 wherein said electric motor is adapted to provide a peak torque during motoring to the steering shaft of at least 50 Nm.

5. An electric power assisted steering system according to claim 1 wherein said magnets lie below the level of the circumference and are covered by a magnetic or magnetically susceptible cover to provide a continuous smooth surface to said rotor structure.

6. An electric power assisted steering system according to claim 1 wherein said rotor rotates within a stator and said smooth surface comprises a substantially continuous outer circumferential surface.

7. An electric power assisted steering system according to claim 1 wherein each said magnet is received within a slot in said rotor below said rotor surface.

8. An electric power assisted steering system according to claim 1 wherein said magnets comprise rectilinear flat bar magnets having planar upper and lower faces which are received within said slots in said rotor.

9. An electric power assisted steering system according to claim 1 wherein said electric motor according to claim 4, wherein said rotor has a unitary construction.

10. An electric power assisted steering system according to claim 1 wherein said rotor is of steel or other suitable metallic material.

11. An electric power assisted steering system according to claim 1 wherein said rotor is hollow, whereby an axle is passed through said rotor to attach the rotor to an output shaft.

12. An electric power assisted steering system according to claim 1 wherein three phases are provided.

13. An electric power assisted steering system according to claim 1 wherein said phases of said motor each comprise a number of phase windings connected in series or in parallel.

\* \* \* \* \*